United States Patent [19]

Song

[11] 3,998,354
[45] Dec. 21, 1976

[54] REUSABLE SEALED PLASTIC COVER

[76] Inventor: John S. Song, 2 Williamsburg Circle, Evanston, Ill. 60203

[22] Filed: Mar. 31, 1975

[21] Appl. No.: 563,600

[52] U.S. Cl. .............................. 220/269; 220/254; 220/307; 220/339; 220/375; 222/153; 222/541

[51] Int. Cl.² ......................................... B65D 41/32

[58] Field of Search .................. 222/153, 498, 541; 220/307, 254, 266, 269, 339, 375; 113/120 XY

[56] References Cited

UNITED STATES PATENTS

| | | | |
|---|---|---|---|
| 2,168,608 | 8/1939 | O'Brien et al. | 222/498 |
| 3,204,829 | 9/1965 | Song | 222/153 |
| 3,282,477 | 11/1966 | Henchert | 222/541 |
| 3,608,771 | 9/1971 | Monroe et al. | 222/541 X |
| 3,744,675 | 7/1973 | Song | 222/153 |

Primary Examiner—Robert B. Reeves
Assistant Examiner—John P. Shannon
Attorney, Agent, or Firm—Darbo, Robertson & Vandenburgh

[57] ABSTRACT

A closure for a container is formed by a plastic body part and a plastic closure part connected by a thin, integral section which forms a "score" line of easy tearability. The closure part has an annular wall slightly smaller than an annular wall of the body part. The score line is adjacent the bottom of the annular wall of the closure part and the top of the annular wall of the body part. Thus after the plastic has been torn along the score line, the annular wall of the closure part slips within the annular wall of the body part to form a reusable closure. The annular wall of the closure part and the annular wall of the body part have conformations that interlock when the two parts are so slipped together to releasably hold the closure part in place.

6 Claims, 5 Drawing Figures

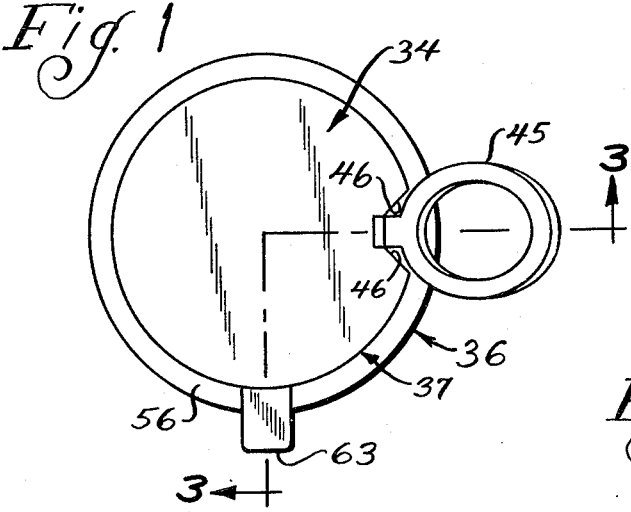
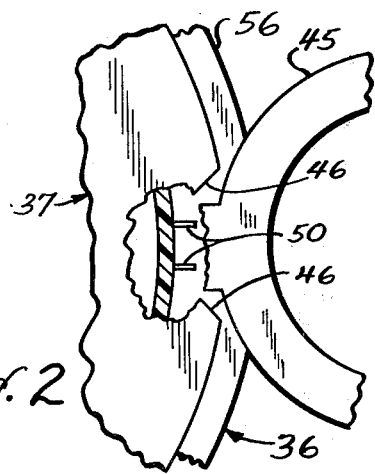
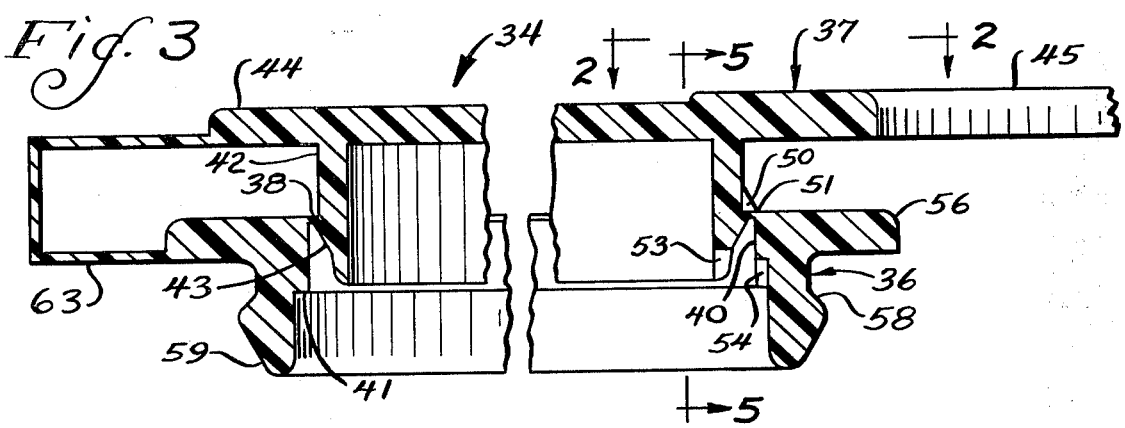
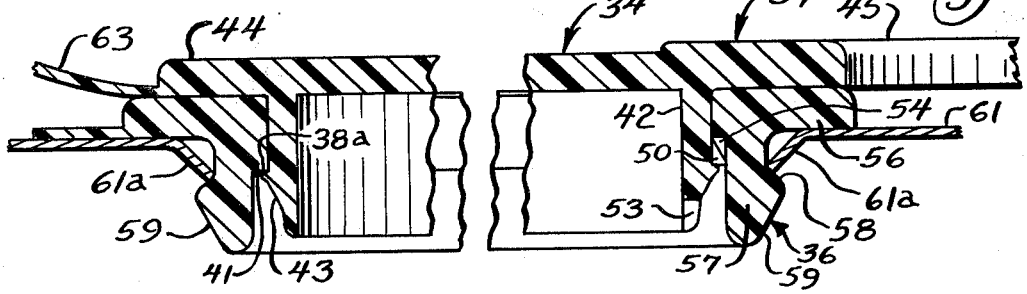
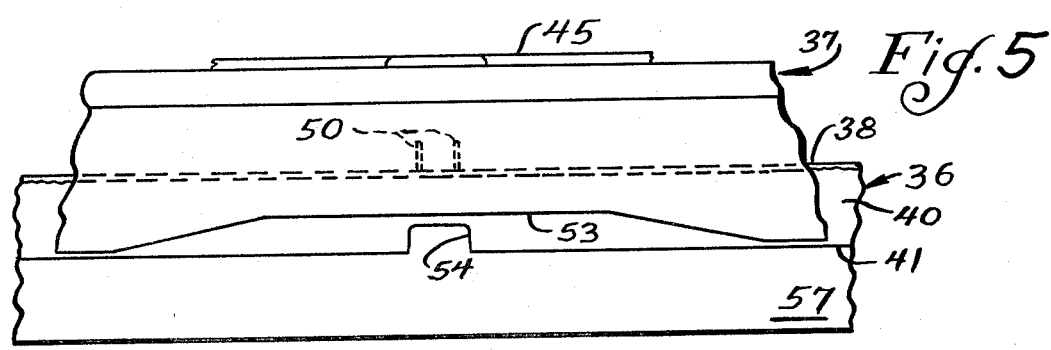

REUSABLE SEALED PLASTIC COVER

BACKGROUND AND SUMMARY OF THE INVENTION

My two prior U.S. Pat. Nos. 3,744,675 and R. 27,611 pertain to a container which has a sealed closure formed of plastic. The plastic defines a "score" line of easy tearability between a closure part and a body part. Arrangements are made to bring this score line to an exterior point at which the tearing of the plastic is easily originated. Thus when the consumer desires to have access to the container, force is applied to the closure at this point to commence the tearing of the plastic. This tearing continues along the score line to separate the closure part from the body part and thus establish an opening in the body part through which opening access to the contents of the container may be had.

In the embodiments of those patents, the closure part is not reusable once the plastic has been torn along the score line. The closure is then discarded. If it is desired to thereafter close the opening in the body part, it is necessary that other closure means be provided.

The principal object of the present invention is to provide a construction such that the original closure part of the sealed container may, after separation along the score line, be reused to provide a removable closure for the opening that resulted when the plastic was torn. An important feature of my invention is that the arrangement is such as to permit the plastic molding of the assembly. As those familiar with the plastic molding art will understand, it is not always possible to obtain a particular configuration by molding, or is possible only with substantial difficulty and/or expense. Some shapes that could be fabricated by the assembling of individual components cannot necessarily be produced, as a practical matter, by molding. When producing a plastic part of the type being discussed, not only is there the problem of producing the integral body part and closure part, but in addition the configuration of the closure part must be reached as to permit its reuse.

Other objects and advantages will become apparent from the following description.

DESCRIPTION OF THE DRAWING

FIG. 1 is a plan view of another embodiment;

FIG. 2 is an enlarged fragmentary portion of FIG. 1, with a portion broken away;

FIG. 3 is a view taken along line 3—3 of FIG. 1;

FIG. 4 is a view similar to FIG. 3 but showing the embodiment on a can top and the position of the closure part when being reused; and FIG. 5 is a partial section as seen at line 5—5 of FIG. 3.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. In the disclosed embodiment there is a body part, generally 36, and a closure part, generally 37. As molded, these parts are joined by a thin section 38 forming a score line.

The body part includes an annular wall 40, the thin section 38 being located at the top of this wall. At the bottom of the wall 40 is a step or abutment 41. The closure part 37 has an annular wall 42 of the same general configuration as that of wall 40, but slightly smaller. The thin section 38 is adjacent the bottom of wall 42. At the bottom of annular wall 42 and immediately below the thin section 38 there is a truncated conical section 43. As will be seen in the drawings, the top of this section 43 extends radially outwardly a greater distance than does annular wall 42. Thus after the thin section 38 is torn a protruding lip 38a (FIG. 4) remains.

At the top of wall 42 is a circumferential flange or integral wall means 44. This flange is approximately normal to the wall 42 and extends substantially about the entire periphery of the closure part, except for the location of handle 45. At the location of handle 45 the flange terminates in a pair of notches 46. The proximal portion 47 of handle 45, which proximal portion is set off by notches 46, is somewhat thicker than the remainder of the top of the closure. Extending downwardly along wall 42, below the proximal portion 47 of the handle 45, are two gussets 50. These each form an "edge" approximately at the location indicated by the number 51 in FIG. 3 to facilitate the tearing of the plastic as described in my aforementioned patents.

In the general location of handle 45, the annular wall 42 of the closure is not as deep (has less vertical height as viewed in the drawings) as is the remainder of the wall. This area of decreased size is indicated by the number 53 in the drawings. The purpose of this is to provide additional flexibility to the wall 42 in the handle area. This facilitates the initiating of the tearing of the score line. In the same general area, the annular wall 40 has a recess 54. The purpose of this is to accommodate the remains of the gussets 50 after the closure is torn away and the closure reused.

The body part 36 includes a flange 56 extending outwardly from wall 40. Extending downwardly from flange 56 is an annular wall 57. Wall 57 has a truncated conical face 58 which slants outwardly and an inwardly slanted truncated conical face 59 adjacent the distal end of the wall.

The top 61 of the container with which this embodiment is used has an inwardly extending flange 61a about the opening in which the embodiment is inserted. The distal end of the flange 61a presses tightly against the face 58 when the plastic part is inserted into the can lid. This not only provides a seal at this location, but also pulls the flange 56 against the top 61 of the container to provide a seal at that location. As molded, the body part 36 is somewhat oversize so that the wall 58 has a larger diameter than the diameter of the opening defined by the flange 61a. The truncated face 59, along with the fact that the flange 61a slants inwardly, permits the body part 36 to be forced into that opening to the position illustrated in FIG. 9. However, when this is completed, the wall 57 remains forced inwardly to a somewhat smaller diameter than was its diameter when it was molded, due to the inward pressure of flange 61a on face 58. This is done not only for the purpose of obtaining a seal between the body part 36 and the container top 61, but also pushes the wall 57 inwardly so that at step 41 the diameter is smaller than was the case when the closure arrangement 34 was molded. This permits the lip 38a to engage under step 41 when the closure part 37 is reused after being torn off.

The closure arrangement 34 is molded in the form illustrated in FIG. 3. After a can has been filled it is inserted into the opening in the top 61 of a container. Thereafter, when it is desired to obtain access to the contents of the container, that person will grasp handle 45 and pull upwardly in a direction generally normal to the top 61 of the container. The force so applied causes the plastic to commence tearing at the "edges" 51 of the gussets 50. Once the tearing has commenced it propagates into the score line 38. The pulling force on handle 45 is maintained until all of score line 38 is torn, whereupon the closure 37 is completely detached from the body 36.

After part of the contents of the container have been removed through the opening defined by walls 40 and 57, the closure 37 is placed over that opening and pressed into the position illustrated in FIG. 4. Of course, in this position the container is closed. When the thin section 38 was torn, an annular lip 38a was left about the periphery of the wall 42. This lip locks into the recess at the bottom of wall 40 (at step 41) to releasably hold the closure part 37 in place in the body part 36. The gussets 50 fit into recess 54 in the body part so that they do not interfere with the seating of the closure part of the body part.

To ensure that the closure part 37 is placed on the body part 36 in an orientation such that the gussets 50 will be aligned with recess 54, the two parts are connected by a strap 63 which is unitary to both parts 36 and 37. This strap is sufficiently long so as not to interfere with the separation of the closure part from the body part (serving much in the nature of a very loose hinge). At the same time when the closure part is replaced on the body part the strap limits the orientation of the closure part to the position at which the gussets 50 will be aligned with recess 54. Thus the gussets employed to initiate the tearing will not interfere with the seating of the closure when it is being reused after detachment from the body part.

I claim:

1. In the combination of a container having a top with an edge defining an opening in the top and a molded plastic closure arrangement comprising a body part and a closure part joined to the body part by a unitary thin section forming a score line along which the plastic is tearable with relative ease, said body part having annular wall means extending through said opening and in annular contact with said edge, said edge pressing said wall means inwardly to provide a sealing contact therebetween, said wall means defining a first annular wall having a top and a bottom, said removable portion including a second annular wall in juxtaposition to said first and also having a top and a bottom, said score line being between said walls, the improvement comprising:
   said score line being adjacent the top of the first wall and adjacent the bottom of the second wall whereby there is a portion of the first wall below the score line and a portion of the second wall above the score line;
   said annular contact being approximately opposite a bottom part of said first annular wall whereby the pressing of said edge displaces said bottom part inwardly after the closure arrangement is joined to the container from the position of said bottom part prior to said joinder; and
   said second wall including means at substantially the same height as the thin section defining a lip integral with the thin section and extending outwardly farther than the bottom of the first annular wall when said closure arrangement and container are joined;
   whereby after the plastic at the score line is torn and the closure part is inserted into the body part with the said walls in juxtaposition, said lip projects outwardly below said first wall to releasably lock the closure part to the body part.

2. In the combination as set forth in claim 1, wherein said means of said second wall includes a truncated conical face larger at the top than at the bottom.

3. In the combination as set forth in claim 2, wherein the closure arrangement includes a gusset extending outwardly from said second wall and integral with said thin section, said gusset defining an edge at which the tearing of the plastic can be initiated with relative ease, said closure part including integral wall means extending outwardly from said second wall and at the top thereof and extending across the top of the first wall and spaced therefrom, said integral wall means being at a plurality of angular positions about said second wall, whereby after the plastic is torn along the score line and the two walls brought into juxtaposition said integral wall means contacts the top of said first wall to prevent further movement of the removeable portion into the body portion, said first annular wall defining a recess adjacent the bottom of the first wall and at a position to receive said gusset when said integral wall means contacts the top of said first wall.

4. In the combination as set forth in claim 1, wherein the closure arrangement includes a gusset extending outwardly from said second wall and said integral with said thin section, said gusset defining an edge at which the tearing of the plastic can be initiated with relative ease, said closure part including integral wall means extending outwardly from said second wall and at the top thereof and extending across the top of the first wall and spaced therefrom, said integral wall means being at a plurality of angular positions about said second wall, thereby after the plastic is torn along the score line and the two walls brought into juxtaposition said integral wall means contacts the top of said first wall to prevent further movement of the removable portion into the body portion, said first annular wall defining a recess adjacent the bottom of the first wall and at a position to receive said gusset when said integral wall means contacts the top of said first wall.

5. In the combination as set forth in claim 4,
   wherein said closure part includes a handle having a distal end at the top of said second wall and above said gusset; and
   including a flexible strap integral with said parts for maintaining the closure part oriented with respect to the body part.

6. In the combination as set forth in claim 1, wherein said means defining a lip is circumscribed by said first annular wall as said plastic closure arrangement is molded.

* * * * *

UNITED STATES PATENT AND TRADEMARK OFFICE
CERTIFICATE OF CORRECTION

PATENT NO. : 3,998,354
DATED : December 21, 1976
INVENTOR(S) : John S. Song

It is certified that error appears in the above–identified patent and that said Letters Patent are hereby corrected as shown below:

Column 1, line 6, "R." should read --RE--.
Column 1, line 42, "reached" should read --such--.
Column 1, line 64, "In the" should start a new paragraph.
Column 3, line 53, --wall-- should be inserted after "first".
Column 4, line 11, "the" should be deleted.
Column 4, line 30, "removeable" should read --removable--.
Column 4, line 37, "said", second occurrence, should be deleted.
Column 4, line 45, "thereby" should read --whereby--.

Signed and Sealed this

Twelfth Day of April 1977

[SEAL]

Attest:

RUTH C. MASON
*Attesting Officer*

C. MARSHALL DANN
*Commissioner of Patents and Trademarks*